Nov. 11, 1924.  H. ST. PIERRE  1,515,285
EQUALIZING LINK FOR ANTISKID CHAINS
Filed Oct. 20, 1923
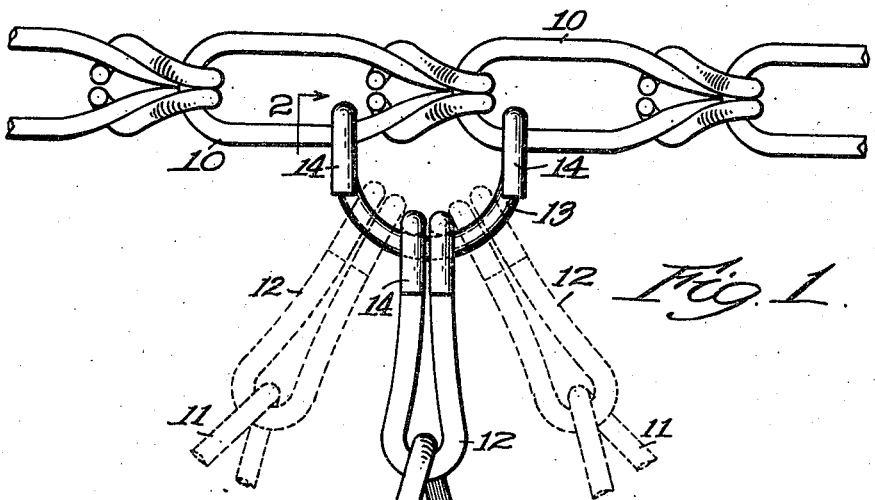
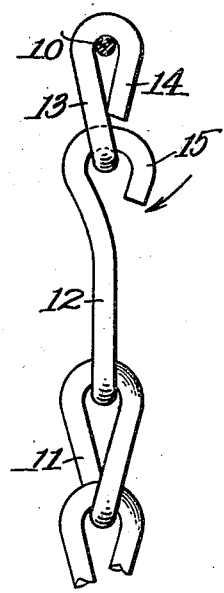
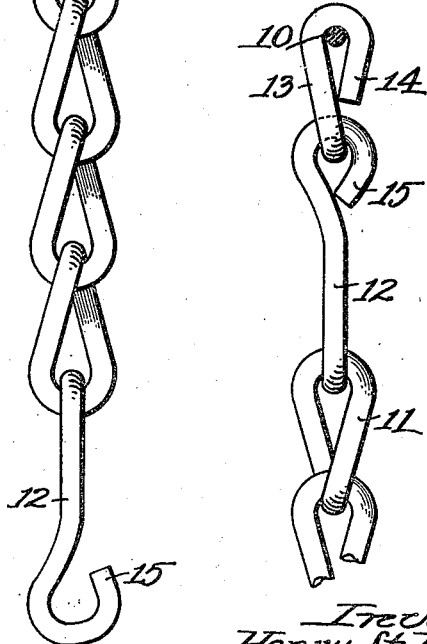
Inventor
Henry St Pierre
By Attorneys
Southgate & Southgate Patented Nov. 11, 1924.

1,515,285

UNITED STATES PATENT OFFICE.

HENRY ST. PIERRE, OF WORCESTER, MASSACHUSETTS, ASSIGNOR TO ST. PIERRE CHAIN CORPORATION, OF WORCESTER, MASSACHUSETTS, A CORPORATION OF MASSACHUSETTS.

EQUALIZING LINK FOR ANTISKID CHAINS.

Application filed October 20, 1923. Serial No. 669,812.

*To all whom it may concern:*

Be it known that I, HENRY ST. PIERRE, a citizen of the United States, residing at Worcester, in the county of Worcester and State of Massachusetts, have invented a new and useful Equalizing Link for Antiskid Chains, of which the following is a specification.

This invention relates to a link for use on automobile chains for non-skid purposes. The principal objects of this invention are to provide a link for connecting the cross chains with the side chains which will divide the pulling strain of the cross chain and distribute the wear on the side chain to two links instead of concentrating it all on one; to permit freer working action of the cross chain in combination with the side chain; to facilitate the removal and replacement of the cross chain; to shorten the length of the cross chain by one link, thus lowering the cost of each cross chain replacement; and to double the strength and the life of the side chain.

Other objects and advantages of this invention will be hereinafter described.

Reference is to be had to the accompanying drawings in which—

Fig. 1 is a full size view showing a part of a side chain and cross chain connected therewith by an equalizing link constructed in accordance with this invention;

Fig. 2 is a side view of a portion of the cross chain as indicated by the arrow 2 in Fig. 1 and showing it in the condition in which the cross chain is manufactured and sold; and Fig. 3 is a similar view showing the position of the parts when permanently attached.

It has been customary heretofore to connect the cross chains of non-skid chains with the side chains by a hook or link having two legs of course and both connected with one link of the side chain. This is disadvantageous I find for the reason that the use of the non-skid chain results in the irregular vibration and pulling of the cross chain on the links of both ends with which it is connected. These links extend longitudinally and permit of some sliding motion at the point of contact. Considerable wear takes place here and it is not feasible to make the links which are to receive the cross chains any stronger or larger than the other links of the side chains. The result is that these particular links eventually get a great deal of wear and eventually give way. Furthermore, there is apt to be some cramping of the ends of the cross chains at these points because very little room is provided for the necessary motions of the parts.

This invention is designed primarily to obviate or lessen these difficulties and to provide a device which will have much longer life itself and which will reduce the wear on the side chains very materially and give all necessary freedom of action to the cross chains. For this purpose I have shown an ordinary side chain 10. It will be understood that any kind of side chain can be employed in connection with this invention. I have also shown it as provided with cross chains consisting of five links 11 instead of the six links usually employed. The advantage of this will appear later. At each end of the cross chain proper is provided a link 12, as has to be the case in all of these cross chains, but instead of connecting the end of each of these links with one of the links 10 of the chains, an equalizing link 13 is introduced. This equalizing link is of arcuate shape and preferably semi-circular as shown. It is provided with two hooks 14 at its ends, these hooks being in parallel planes at the ends of the semicircle and tangent thereto. Each of these hooks is intended to enter one of the links 10 of the side chain and the two hooks enter two adjacent links.

On account of the fact that this equalizing link is of arcuate form, the connecting link 12 by which it is connected to the chain 11 is free to move as indicated in dotted lines in Fig. 1 and all cramping of the chain at this point and twisting of the end link 12 is thereby avoided. In other words, the connection is entirely flexible and permits free working action of the side chain and cross chain.

The most important function of this equalizing link, however, is that it divides the pulling strain of the cross chain and the wear of the side chain between two adjacent links 10. Each one therefore gets half the wear that it has had heretofore and it has to stand half the side pull that it did heretofore. Further, it will remain in operation longer before it gets down to any specified thinness and as the pull on it is reduced by half, it will sustain it even after being worn down to the point at which it would give way under usual conditions. This more than doubles the strength and the length of wear of the side chain.

It is obvious that the part that is discarded when one of the cross chains is broken consists of the entire cross chain and the two end links 12. These several links constitute the cross chains in this case and also in the prior devices. However, in my chain there are only five links 11 whereas in the ordinary cross chain there are six, in order to provide length enough to permit the ends of the links 12 to engage the links 10. Therefore, the part that has to be thrown away every time a cross chain is broken is reduced by one link. This reduces by one-sixth substantially the cost of the cross chain. This therefore is an important advantage.

It will be noted that the equalizing link 13 is permanently mounted on the two links 10, that is the hooks 14 are bent over and not intended to be bent back to remove the equalizing link each time the cross chain is broken and discarded, although the equalizing links can be replaced if necessary. The part that is ordinarily replaced is the cross chain including the links 11 and the two links 12. I provide an improvement over the ordinary arrangement for this purpose by manufacturing these links 12 with their hook ends 15 in the form indicated in Fig. 2. They have been made heretofore with these hooks wide open. Consequently when they were put on, the hook had to be bent around through more than a quarter circle which is a pretty heavy strain for a link made of the kind of wire of which these are usually constructed. After being bent down to clamp the hook in position, it is often found that the metal has been crystallized and the hook rendered useless so that another cross chain has to be put on. The principal trouble, however, is that on account of the size and character of these wires, it is a difficult thing to bend the hook down properly with the tools ordinarily at hand. It requires considerable strength and sometimes it is overdone and the hook is crushed. By making the hook in such a shape that there is left a space between it and the shank of the wire of substantially the same width as the wire of the equalizing link 13, it will be seen that after they are assembled as shown in Fig. 2 the hook 15 can be bent over to the position shown in Fig. 3 with comparatively very little force so that it is easy to unite the parts so that they will not become dislodged in use. If the hook 15 is annealed in the condition shown in Fig. 2 the strain previously put on it is relieved, then the final bending operation puts only a small strain on it.

Furtheremore, as the hook 15 is spaced from the shank just enough to let in the wire 13, the bending over of the hook afterwards, even to a slight degree, will close this space and prevent the disconnection of the link 12 from the equalizing link 13. Thus the cross chain is safe even when put on carelessly. This also is an important feature of this invention.

Although I have illustrated and described only a single form of the invention I am aware of the fact that modifications can be made therein by any person skilled in the art without departing from the scope of the invention as expressed in the claim.

Therefore, I do not wish to be limited to all the details of construction herein shown and described but what I do claim is:—

The combination with a side chain for a tire, of an equalizing link permanently connected to two of the links of said chain, and a removable cross chain having an end link provided with a hook for engaging the equalizing link and being manufactured with a space between the end of the hook and its shank just sufficient to permit of the insertion of the equalizing link, whereby the bending of the said hook inwardly a slight distance will prevent the disengagement of the equalizing link from the end link.

In testimony whereof I have hereunto affixed my signature.

HENRY ST. PIERRE.